Aug. 4, 1942.　　　　M. A. SISK　　　　2,292,329
PIPE FITTING
Original Filed July 30, 1938
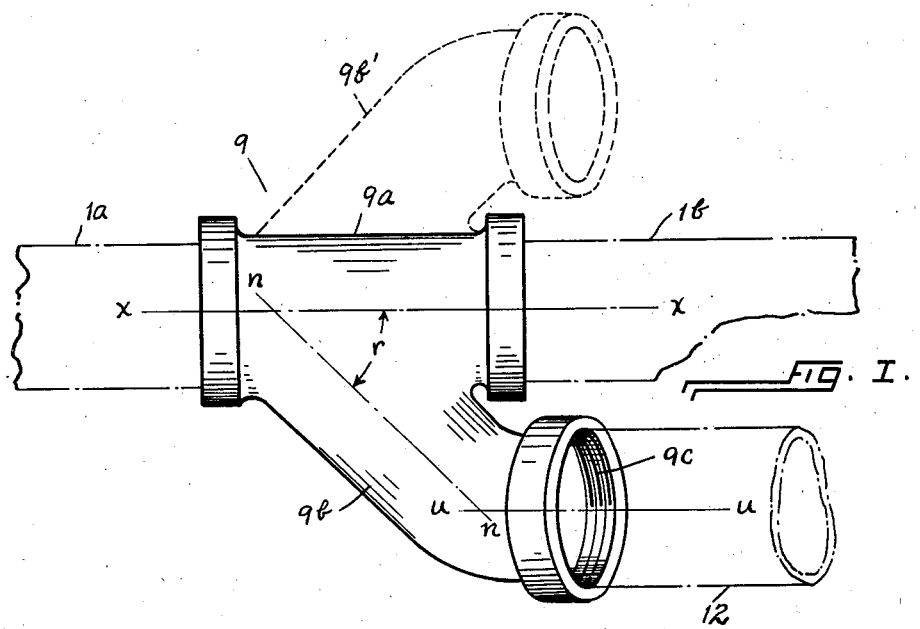
Fig. I.
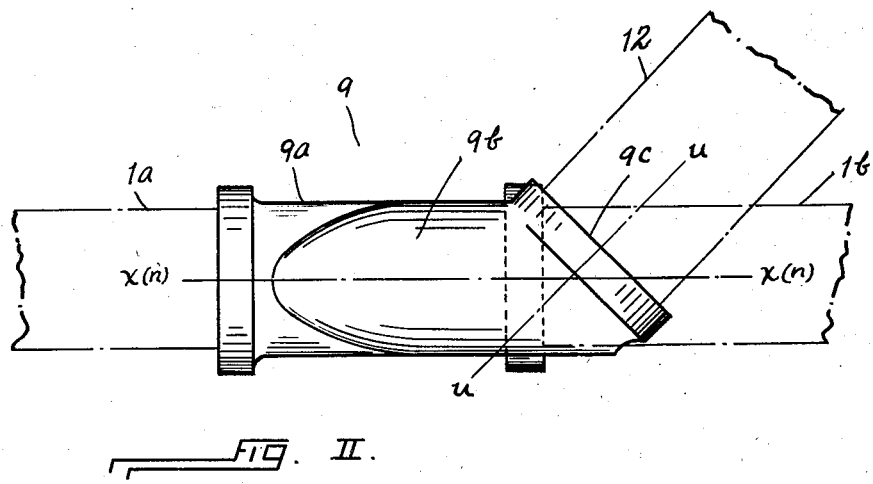
Fig. II.
INVENTOR
Martin A. Sisk
by Christy, Parmelee and Wharton
his attorneys Patented Aug. 4, 1942

2,292,329

UNITED STATES PATENT OFFICE 2,292,329

PIPE FITTING

Martin A. Sisk, Pittsburgh, Pa.

Original application July 30, 1938, Serial No. 222,205. Divided and this application September 21, 1940, Serial No. 357,682

3 Claims. (Cl. 285—210)

My invention relates to plumbing installations, and consists in an improved pipe fitting that in structure is designed particularly, though not exclusively, for use in a plumbing installation of the sort illustrated and described in an application for patent, Serial No. 222,205, filed by me July 30, 1938, now Letters Patent No. 2,216,460, dated October 1, 1940. My present application comprises a division of such earlier application.

In the accompanying drawing a pipe fitting embodying the invention is illustrated:

Fig. I is a view of the fitting in plan; the dotted lines in this view represent how a certain branch portion of the fitting may be arranged in an alternate position upon the main body portion of the fitting; and the broken lines added to the view indicate piping with which the fitting may be assembled;

Fig. II is a view of the fitting in side elevation, the broken lines illustrating associate piping as in Fig. I.

Referring to the drawing, the pipe fitting 9 of this invention is of tubular structure, including a main body portion 9a and a branch portion 9b extending angularly from such main body portion. The main body portion 9a of the fitting is at its opposite ends belled and internally threaded (in this case) for connection to the pipe sections 1a and 1b. In like manner the mouth of branch 9b is belled and internally threaded, to receive a nipple 12.

The branch portion 9b extends at an angle r from body portion 9a, and its axis n—n extends in common plane with the axis x—x of the portion 9a; the portion 9a is axially aligned with the assembled pipe sections 1a, 1b; the threaded openings at the opposite ends of the body portion 9a lie in planes normal to the longitudinal axis x—x of such body portion; and the branch portion 9b curves from the general direction of its extent, in such manner that the opening 9c (an internally threaded opening) at the distal end of the branch portion 9b is inclined to the common plane of the two body portions 9a and 9b. More specifically, the curvature or form of the branch portion 9b is such that the axis u—u of its terminal opening 9c extends (as viewed from above said common plane of the two body portions 9a and 9b) in parallelism with the axis x—x of the body portion 9a, and (as viewed in a plane parallel with such axis x—x and normal to the plane first mentioned) extends obliquely (45 degrees in this case) to the axis x—x of said body portion 9a.

It is important to note that, as the fitting is viewed in Fig. II, the inclined opening 9c lies substantially within the common vertical extent of the two portions 9a and 9b that form the fitting. That is to say, the inclined opening 9c is positioned below the horizontal plane that is tangent to the tops of the belled ends of portion 9a of the fitting, as shown in Fig. II.

The branch portion 9b of the fitting may be arranged on the opposite side of the main portion 9a from that in which it is shown, the dotted lines 9b' in Fig. I indicating such alternate position of the branch portion. Also, it will be understood that the fitting may include two branch portions arranged on diametrically opposite sides of the main body portion 9a, the full lines 9b indicating one of such branch portions, and the dotted lines 9b' the other. By virtue of such doubly branched structure, two nipples 12 may be connected to a single fitting 9.

The fitting of the invention may be further modified within the terms of the appended claims.

I claim as my invention:

1. An integral pipe-fitting comprising a tubular body terminating at each of its opposite ends in an opening that lies in a plane normal to the axis of such body, and a tubular branch extending angularly from and in common plane with said tubular body; said branch terminating at its distal end in an opening whose axis, as viewed from above said plane, is spaced from and extends parallel to the axis of said tubular body, and, as viewed in a plane parallel to the axis of the tubular body and normal to the plane first mentioned, extends obliquely to the said axis of such tubular body.

2. A fitting including a tubular body having an opening at each end, said openings extending severally in parallel planes and having a common axis, a tubular branch having an opening in a plane oblique to said parallel planes, the axis of said branch opening extending transverse to said common axis and being spaced therefrom.

3. A fitting for installation in a horizontal conduit, including a tubular portion having two openings by means of which the fitting is secured in said conduit, a tubular branch portion having an opening in a plane oblique to the horizontal, the axis of said branch opening, as viewed in a horizontal plane, being spaced laterally from and extending parallel to the axis of said conduit, the point of intersection of the axis of said branch opening with said plane of the branch opening being disposed below the top of said conduit.

MARTIN A. SISK.